United States Patent [19]

Yung

[11] Patent Number: 5,615,649
[45] Date of Patent: Apr. 1, 1997

[54] ENGINE SECURITY SYSTEM

[75] Inventor: Siu M. Yung, Fotan, Hong Kong

[73] Assignee: Cosmo Solution Limited, Fotan, Hong Kong

[21] Appl. No.: 539,694

[22] Filed: Oct. 5, 1995

[51] Int. Cl.$^6$ .............................. F02P 11/04; B60R 25/04; H01H 27/00
[52] U.S. Cl. .............................. 123/146.5 B; 123/198 B; 307/10.3
[58] Field of Search ............................ 123/414, 428, 123/146.5 B, 198 B; 180/287; 307/10.3

[56] References Cited

U.S. PATENT DOCUMENTS

| | | | |
|---|---|---|---|
| 4,141,332 | 2/1979 | Wyler | 123/198 B |
| 4,180,043 | 12/1979 | Kawamura | 123/146.5 B |
| 4,438,752 | 3/1984 | Cheung | 123/198 B |
| 4,452,197 | 6/1984 | Weber | 123/198 B |
| 5,188,069 | 2/1993 | Fiorenza, II | 123/146.5 B |
| 5,222,468 | 6/1993 | Korenaga | 123/198 B |
| 5,492,087 | 2/1996 | Rolland, Jr. | 123/146.5 B |
| 5,519,260 | 5/1996 | Washington | 180/287 |

*Primary Examiner*—Willis R. Wolfe
*Attorney, Agent, or Firm*—Bacon & Thomas

[57] ABSTRACT

An engine security system includes a security device adapted to receive a sequence of timing pulses which is generated in dependence on the rotation of the engine. The device generates an ignition pulse sequence synchronous with rotation of the engine from the sequence of timing pulses on receipt of an enabling code. The ignition pulse sequence is supplied to the ignition system of the engine for the generation of ignition sparks. The pulses in the timing pulse sequence occur at different times from pulses in the ignition pulse sequence. In preferred embodiments, the sequence of timing pulses includes an identity code encoded therein.

20 Claims, 6 Drawing Sheets

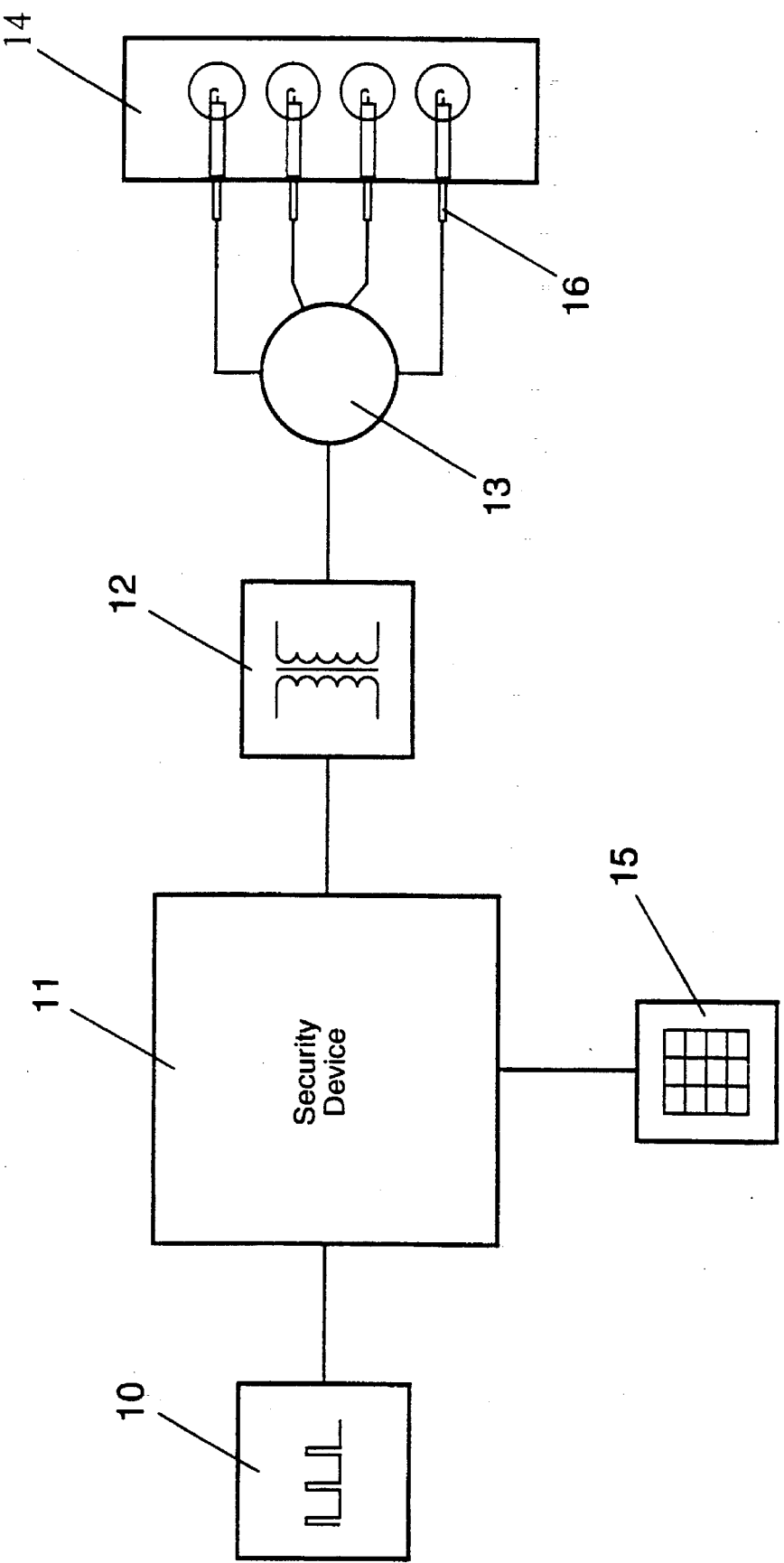

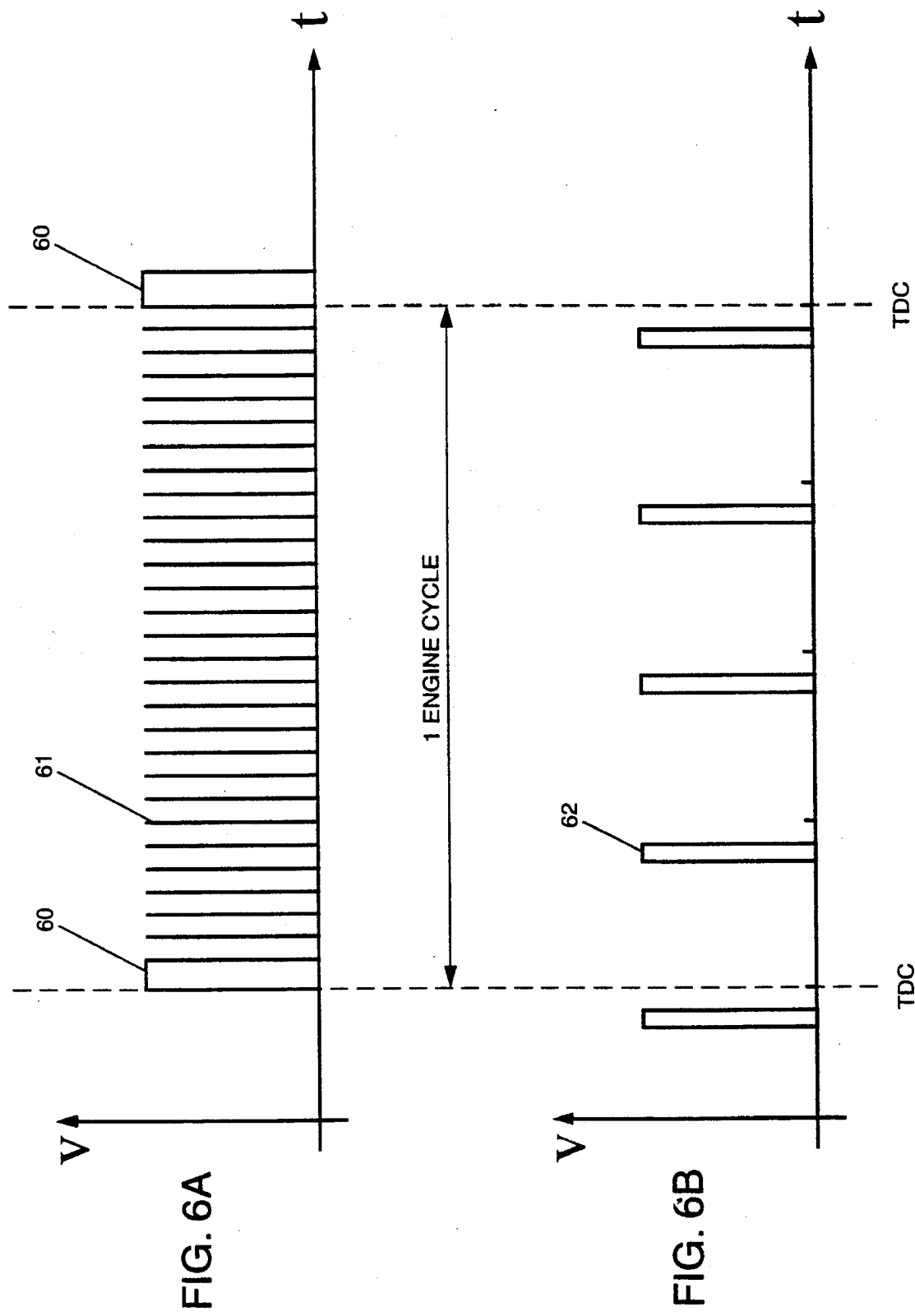

ENGINE SECURITY SYSTEM

FIELD OF THE INVENTION

The present invention relates to an engine security system and more specifically to an engine security system which prevents an engine from starting unless a valid code or key is received by the device.

BACKGROUND OF THE INVENTION

In a spark-ignition internal combustion engine, the combustion mixture is ignited in the combustion chamber by a spark, usually generated by a spark plug. The exact timing of the spark is controlled by an ignition timing system. There are generally two types of ignition timing system.

The first type of ignition timing system is a contact-breaker system in which timing pulses are generated by a set of contact-breakers, also known as points. The contact-breakers are made to open and close in time with the rotation of the engine which causes a voltage to be periodically applied across the low voltage terminals of a transformer, known as a coil. In a four-stroke four-cylinder engine, four timing pulses of dc voltage per engine cycle are supplied across the coil (two pulses per crankshaft revolution). The inductive effect in the coil of the low voltage pulses causes high-voltage ignition pulses to be generated at the high-voltage, or HT, output of the coil, and these ignition pulses are fed to each spark plug in turn via a distributor. In this system, each low voltage timing pulse generated by the contact-breakers corresponds directly to a high-voltage pulse received by the spark plugs.

The second type of ignition timing system is a breakerless or electronic system. Timing pulses are generated in dependence on the rotation of the engine, normally either by means of an optical system including a perforated rotating disc and an optical sensor, or by means of magnets mounted in, for example, the crankshaft or camshaft of the engine passing a magnetic sensor. A fixed number of pulses is generated for each revolution of the engine, which is normally an integral multiple of the number of cylinders of the engine, such as 4, 8 or 12 pulses per revolution for a four cylinder engine. Therefore, the frequency and width of the pulses are dependent on the speed of rotation of the engine. The pulses generated do not usually correspond to the positions required for the high-voltage pulses to generate the spark, but are instead fed to an electronic ignition unit or engine management system which then generates the correct ignition pulses to be supplied to the coil or other high-voltage generating means.

Such ignition systems as described above offer no additional security should a thief gain access to the inside of the vehicle. For the thief to be able to drive the vehicle away, all that is necessary is for the thief to bypass the ignition lock to enable power to be supplied to the engine and starter motor. The engine can then be started and the vehicle driven away.

Many devices have been developed to increase vehicle security, such as additional locks, steering wheel, gear lever or handbrake clamps, alarms and immobilisers, however such devices are often employed to deter the opportunist thief and can be removed or bypassed by professional or determined thieves.

Engine immobilisers have been developed which are often coupled with a vehicle alarm system. If the alarm is triggered, the engine is immobilised and cannot be started. However, such systems often simply prevent the timing pulses from being supplied to the coil. If the thief resets the alarm, or prevents it from being triggered initially, the vehicle may become drivable again. Even if the alarm is triggered and the engine immobilised, a professional or determined thief can gain access to the immobiliser, usually in the engine compartment, and simply bypass the immobiliser which would then allow the timing pulses to be supplied to the coil and the ignition system to operate normally.

Other types of immobiliser are armed and disarmed by the use of an electronic password, which may be contained in an electronic key for example. A disadvantage with such systems, in addition to the ability of the immobiliser to be bypassed, is that an electronic key device belonging to the immobiliser of one vehicle could be used to disarm the immobiliser of another vehicle. This could occur if the password is the same for both immobilisers, which is a possibility as the number of combinations for the code are often limited in order to reduce the complexity of the electronic key device, or if the electronic password is altered to match that of the other vehicle.

An object of the invention is therefore to provide an engine security system such that the engine cannot be started when the device is bypassed.

SUMMARY OF THE INVENTION

According to one aspect, the invention provides an engine security system for an internal combustion engine including a security device adapted to receive a sequence of timing pulses generated in dependence on the rotation of said engine, wherein said device generates an ignition pulse sequence synchronous with the rotation of the engine from said sequence of timing pulses on receipt of an enabling code, said ignition pulse sequence being supplied to the ignition system of said engine for the generation of ignition sparks, and pulses in said timing pulse sequence occurring at different times from pulses in said ignition pulse sequence.

The timing pulses received by the security device are insufficient to allow operation of the engine and therefore, should a thief be able to bypass the device, the engine will still be inoperable. The correct code must be input to the device for it to generate the correct ignition pulses for the engine to operate. The high-voltage sparks may then be generated in a conventional manner, for example by means of a coil.

Preferably, the enabling code is a numerical code, however other enabling methods are envisaged within the scope of the invention. Such methods include the use of a key, encoded magnetic strip, barcode or other data carrier, voice recognition or anatomical recognition (such as fingerprint or palm print recognition).

The engine security system may be suitable for adapting existing ignition systems employing electronic ignition or an engine management system. The security device would be placed between the timing pulse generator and the ignition unit or engine management system, and would produce the necessary pulses for supplying to the ignition unit or engine management system on receipt of the correct enabling code.

According to another aspect, the invention provides an engine security system for an internal combustion engine including a security device, said device being adapted to receive a sequence of timing pulses, said sequence being generated in dependence on the rotation of said engine and containing engine position and rotational speed information, wherein said device generates an ignition pulse sequence synchronous with the rotation of the engine from said information on receipt of an enabling code, said ignition pulse sequence being supplied to the ignition system of said engine for the generation of ignition sparks, and said sequence of timing pulses including an identity code encoded therein.

In this embodiment, more sophisticated decoding must take place for the ignition pulses to be generated. Again, the decoding occurs only on receipt of the correct enabling code by the device.

The identity code may either be a non-zero code, which is the engine's "identity", or it may be all zeros. The identity code is preferably encoded in the sequence of pulses by means of frequency modulation, however any other suitable means of encoding method may be used.

In one preferred embodiment, the identity code encoded in the sequence of timing pulses is the same as the equivalent of the enabling code which must be input to the device to allow operation of the device. In this case, the device needs to perform only a simple comparison to check that the enabling code is correct. However, in another preferred embodiment, the identity code and the enabling code may be different.

In the case where the identity code is zero, the necessary decoding to produce the correct ignition pulse sequence is simplified. In order to reduce the amount of processing further, the number of timing pulses in the sequence corresponding to one cycle of the engine may correspond to the required number of ignition pulses which induce the spark. However, in this case, the timing pulses must still be asynchronous with the required ignition pulses, and should therefore be retarded or advanced with respect to the timing of the ignition pulses. The security device may then either advance or retard the pulses by the required amount to generate the ignition pulses on receipt of the correct code. Thus, the amount of processing required to be performed by the device is simplified, thereby reducing the complexity and cost of the device, however the device is still effective in disabling the engine.

However, with this embodiment, it is theoretically possible that the device could be bypassed and the timing pulse generator simply rotated to advance or retard the timing pulses to the correct position. Therefore, the device is preferably mounted in such a way that the device cannot be physically bypassed, for example either inside or immediately adjacent the coil.

Alternatively, when the identity code is zero, the number of timing pulses generated in each cycle of the engine may equal the number of cylinders multiplied by an integer. However, the number of timing pulses may also equal a predetermined arbitrary number, which is independent of the number of cylinders. Preferably, therefore, the relationship between the number of timing pulses generated in each cycle of the engine and the number of cylinders is arranged in the ratio of M:N where M and N are different integers.

The security system may also comprise a handset which transmits the enabling code to the device. Preferably, the handset transmits at an infrared wavelength.

In order to increase security in the embodiment in which the timing pulses include an identity code encoded therein, the handset may transmit the same identity code with each data transmission. On comparison of the two codes, the device can establish whether the authorised handset is being used to enable the device. If the codes do not match, the device will not produce the necessary ignition pulses.

The transmission from the handset may be encrypted by means of an encryption key before transmission, the device decrypting and validating the transmission on receipt thereof. The encryption key may be generated by any suitable algorithm or formula, however the encryption key is preferably generated by adding the data value of the enabling code to a random number. Preferably, the engine security device periodically transmits a new encryption key to the handset, and this may optionally be after receiving each transmission.

BRIEF DESCRIPTION OF THE DRAWINGS

Embodiments of the invention will now be described by way of example only and with reference to the accompanying drawings, in which:

FIG. 1 shows a block diagram of an ignition system and engine employing the present invention;

FIGS. 6A and 6B show a pulse timing diagram of the embodiment of FIG. 5.

DETAILED DESCRIPTION OF THE PREFERRED EMBODIMENTS

Figure 2B:
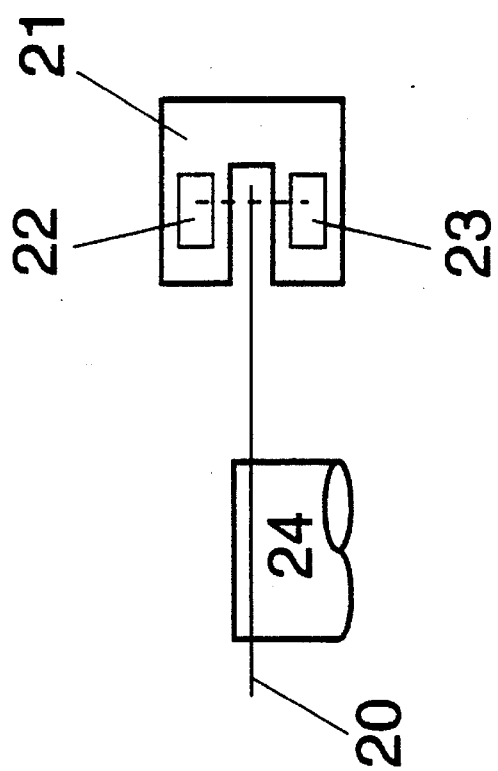
FIGS. 2A and 2B show an optical timing pulse system for use with the present invention.

FIG. 1 shows a block diagram of an ignition system and engine employing the present invention. The ignition system comprises: a timing pulse generator 10, a security device 11 according to the present invention, a high-voltage ignition pulse generator or coil 12, and a distributor 13. The engine is shown as 14.

The timing pulse generator 10 may be any suitable generator which produces pulses whose position and frequency are fixed in relation to the position and speed of rotation of the engine. For example, the generator may be a magnetic pick-up pulse generator in which magnets are mounted on the camshaft or crankshaft of the engine. The magnets pass a sensor in turn as the engine rotates and the sensor generates a pulse as each magnet passes. Alternatively, the timing pulse generator may be an optical pulse generator, as shown in more detail in FIG. 2.

The timing pulses output from the timing pulse generator 10 are configured such that, if they were to be connected directly to the coil 12, the engine would not operate.

The security device 11 converts the timing pulses to ignition pulses which are correctly timed to allow the engine to operate, but this conversion takes place only on receipt of a valid code which must be input to a keypad 15 by the driver of the vehicle.

High-voltage ignition pulses are produced from the ignition pulses by the coil 12 and supplied to the distributor 13. The distributor then passes a high-voltage ignition pulse in turn to each spark plug 16 in the engine for ignition of the combustion mixture in each cylinder.

Figure 2A:
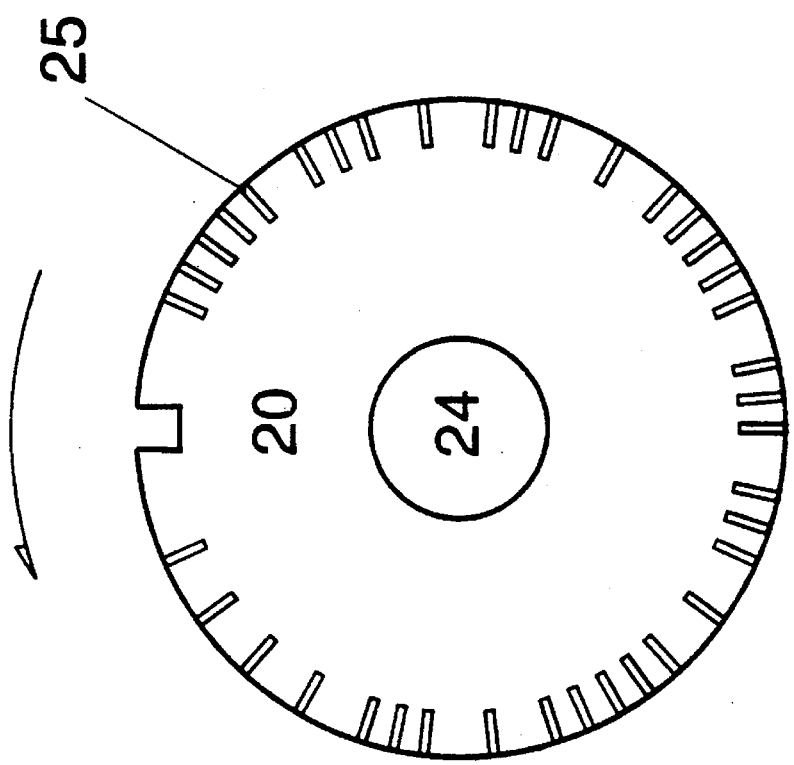

FIG. 2 shows an optical timing pulse system for use with the present invention. The system consists of a rotating circular disc 20, whose angular position and speed of rotation is fixed in relation to the position and speed of the engine, and an optical pick-up device 21 including an optical transmitter 22 and receiver 23 mounted above and below the disc respectively. In conventional ignition systems, the optical disc is mounted on the same rotating shaft 24 as the distributor, and such an arrangement would be satisfactory for the purposes of this invention.

The disc contains holes 25 which cause the optical receiver 23 on one side of the disc to receive light transmitted by the optical transmitter 22 on the other side of the disc. The characteristics of the receiver will change when light is incident on it, for example its resistance may alter, thereby changing the potential drop across it. In this way, a train or sequence of timing pulses corresponding to the arrangement of holes on the disc is produced by the optical pick-up device 21. This sequence of timing pulses will then also have a fixed relationship with respect to the angular position and speed of rotation of the engine. The optical disc shown is suitable for producing a sequence of pulses as in FIG. 4A.

Figure 3:
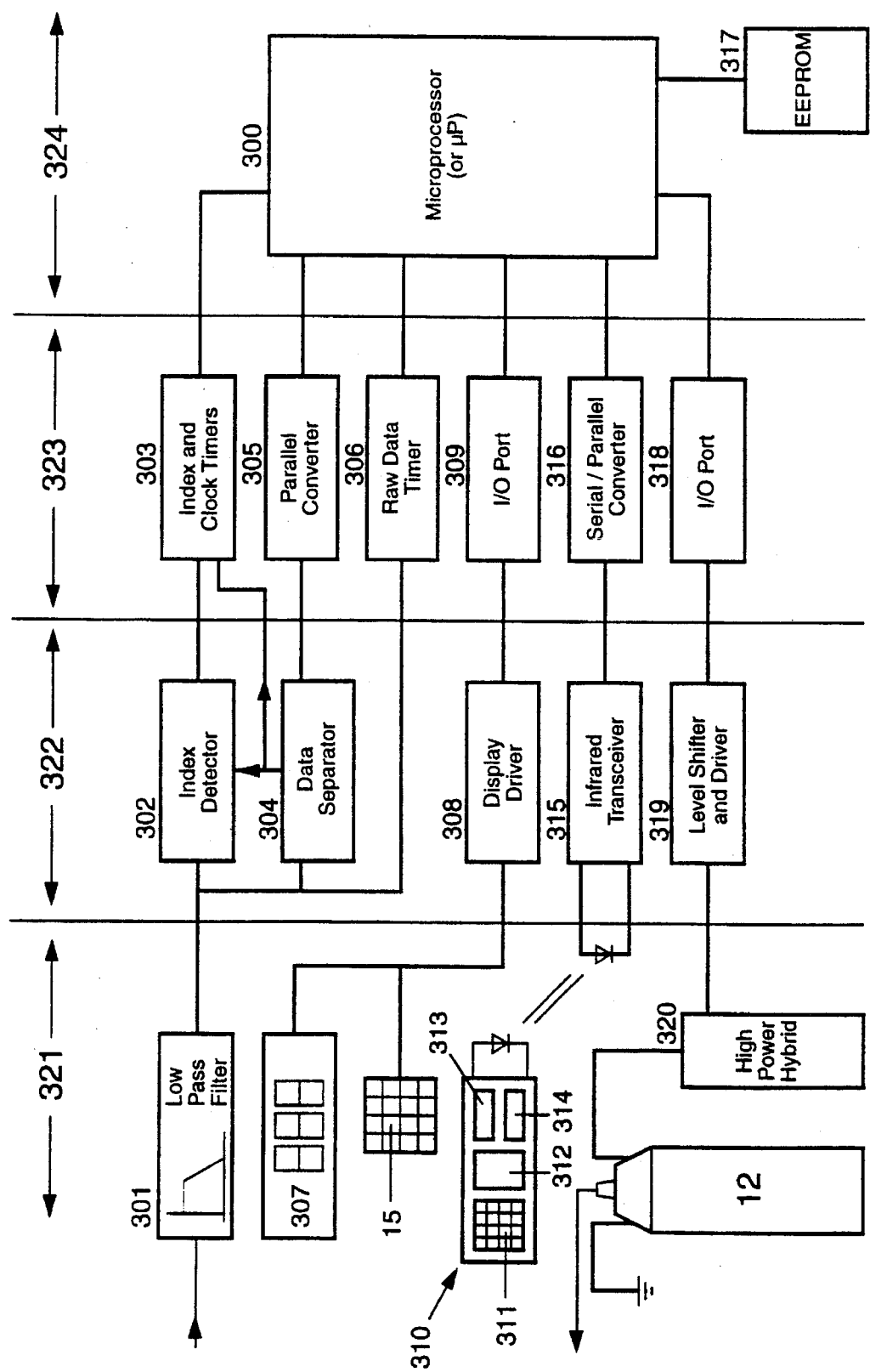
FIG. 3 shows a block diagram of the security device according to a first embodiment of the present invention.

FIG. 3 shows a block diagram of the security system of the present invention according to a first embodiment. The system block diagram is divided into physical interface 321, pre-processing hardware 322, microprocessor input/output 323 and processor 324.

The security device 11 comprises a microprocessor 300 including read only memory for storing the program code and random access memory for use by the microprocessor during operation. The pulses from timing pulse generator 10 pass through low pass filter 301, which serves as a noise filter, pulse shaper and level shifter, etc.

The timing pulses are supplied to three circuits:

1) index detector 302, which detects and supplies the index pulses (see FIG. 4A) to index and clock timers 303 which provide clock signals to the microprocessor and other devices;
2) data separator 304 which separates out the encoded data from the timing pulse signal and supplies the data to serial to parallel converter 305 and on to the microprocessor 300; and
3) raw data timer 306 which supplies the timing of the data to the microprocessor.

Keypad 15 includes a display 307, both of which are connected to keypad scanner and display driver 308. The keypad and display information travels to and from the microprocessor via I/O port 309.

The security device 11 generates ignition pulses from the information provided in the timing pulse signal on receipt of an enabling code, which in this embodiment is supplied by remote handset 310. Handset 310 comprises a keyboard 311, microprocessor 312, infrared transceiver 313 and memory device 314, such as an EEPROM or Smart Card. The serial infrared signal is transmitted from the handset to infrared transceiver 315 and the data is passed to the microprocessor via serial/parallel converter 316.

In order to start the engine, the user keys in a password. The microprocessor in the handset uses an encryption key stored to encrypt the password. The encrypted password is then sent to the security device for decryption and validation. After a successful login, a new encryption key is sent back to the handset and will be used for encryption next time. The handset acknowledges the successful reception of the new encryption key so that both the handset and the security device use the same encryption key next time. In this way, the data sent via the infrared link is different each time. In addition, error recovery may be performed on the signal received by the security device. All transmissions from the handset should preferably also contain the serial number of the device, which is stored in the device memory.

In a preferred embodiment, the password, which is in the form of a data string, is encrypted by adding the data value to a random number which is generated from a list of predefined random numbers stored in memory (ROM). The first random number to be selected from the list of available numbers for encryption can be determined by the value of the first key of the password, and the subsequent keys can determine the direction and step width along the list of stored random numbers.

The user has the ability to change the password, and this is stored in the memory device 314 in the handset 310.

EEPROM 317 is also provided for storing the initial default settings of the device such as device serial number, initial angle offset of the ignition pulse in relation to the index pulse or the engine position, initial encryption key, user password, etc. Reading and writing from and to the EEPROM can be achieved using conventional methods.

When power is received by the device, when for example the vehicle's ignition is turned on, the microprocessor waits for the correct code to be input to keypad 15. Once the correct password has been entered, and has been encrypted with the correct key and successfully received by the microprocessor, the microprocessor converts the timing pulses from the timing pulse generator 10 to the correct sequence of ignition pulses. These ignition pulses are output via I/O port 318, level shifter and driver 319 and high power hybrid 320 to the coil 12, and the engine can then be started.

In internal combustion engines, the ignition pulse must normally be generated fractionally before the piston reaches the top of its compression stroke in a four-stroke engine, to allow for the delay in the coil producing the high-voltage pulse and the delay in the spark being produced in the cylinder. The top of the compression stroke is known as "top dead centre", and the time at which the ignition pulse must be generated is measured in degrees (i.e. out of a 360 degree revolution of the crankshaft) "before top dead centre". The start of the engine cycle is usually taken to be when the first piston is at top dead centre, and this is shown as "TDC" in the figures. The timing diagrams are for a four cylinder four-stroke engine, in which two ignition pulses are required for each revolution of the crankshaft.

An engine running at high speed normally requires a more advanced spark than when running at a lower speed. In a conventional contact-breaker system, this advance is provided mechanically by using the engine vacuum. In a conventional electronic ignition system, the correct spark advance may be established from a look-up table, using, among other factors, engine speed and load as inputs.

In the present invention, the desired advance may be achieved as in a conventional contact-breaker system by mounting the timing pulse generator 10 on a conventional contact-breaker mounting, usually on the distributor shaft. The correct vacuum-generated advance will then be applied to the timing pulses before reaching the security device, and no further processing is required. Alternatively, the security device may include a look-up table in its memory (ROM), and can determine the correct advance for the current engine speed from this table. The duration of the ignition pulse can also be adjusted in this manner.

Once the security device has been activated and is converting the timing pulses into the correct ignition pulses, top dead centre is detected by the device for each cycle from the index pulse 60. The rotational speed of the engine is ascertained from the period of the raw data input, i.e. the timing pulse sequence as received from the timing pulse generator, without separation, by raw data timer 306. The angular position of the engine is calculated from the period of the timing pulses which gives the instantaneous angular speed, and the accumulation of these values gives the angular position of the engine from the start of the engine cycle.

Figure 4:
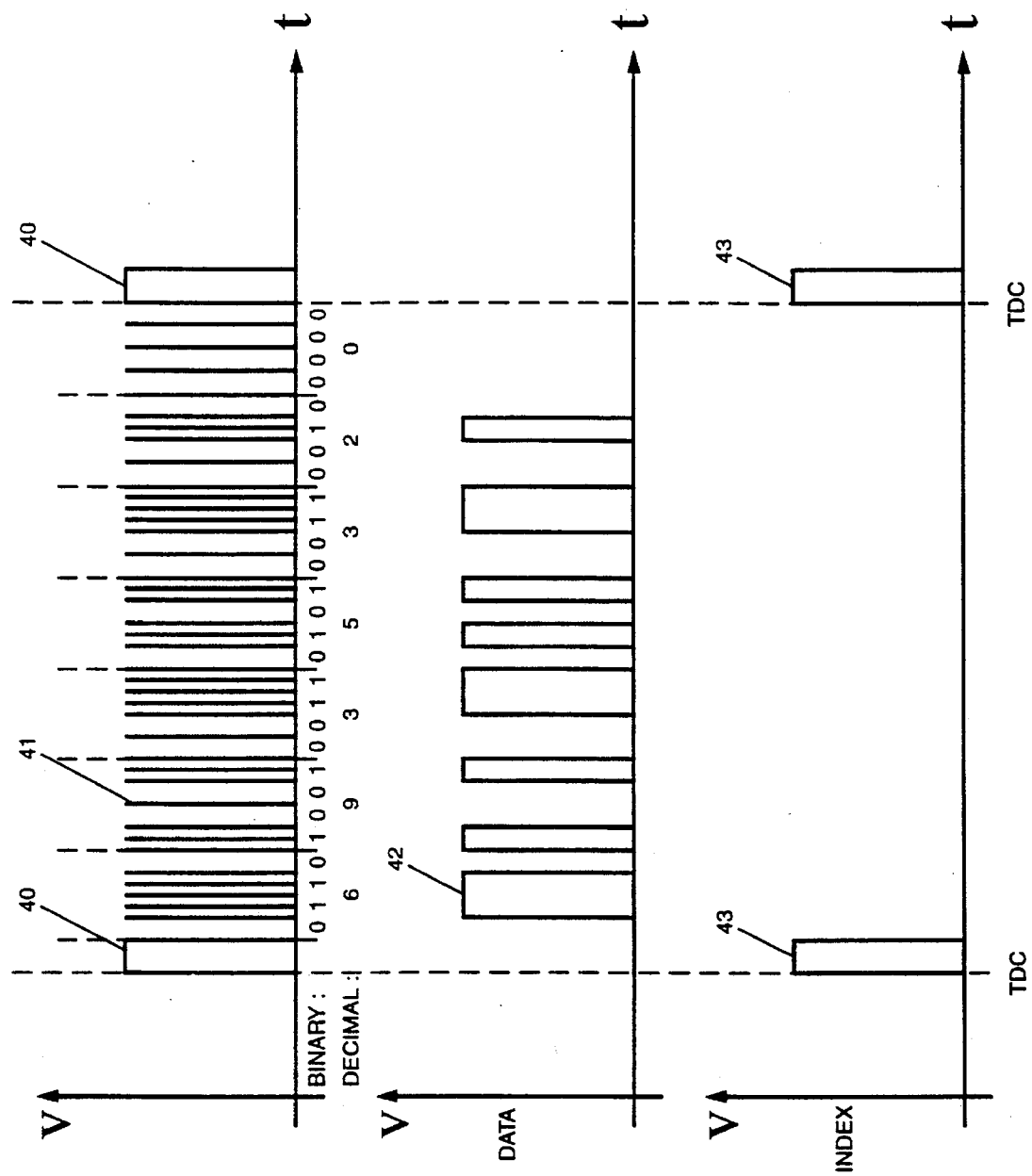
FIGS. 4A, 4B and 4C show a pulse timing diagram of the embodiment of FIG. 3.

FIGS. 4A, 4B and 4C show a timing diagram for the first embodiment of the invention. In this embodiment, the sequence of timing pulses consists of an index pulse 40 marking the beginning of one revolution of the engine together with a number of other pulses 41 representing data, as shown in FIG. 4A. In the specific example shown, the data code is a 7 byte word representing the engine identity, with each byte consisting of four bits. The data is encoded in the timing pulse sequence by means of frequency modulation, with one frequency representing a bit of zero and a second frequency (in this case twice the first frequency) representing one.

In this embodiment, the data separator 304 and index and clock timers 303 analyse and separate the index pulses and data from the sequence of timing pulses. The separated data 42 and index pulses 43 are shown in FIGS. 4B and 4C respectively.

The encoded data shown is the binary equivalent of the decimal sequence "6-9-3-5-5-3-2-0". In a preferred embodiment, this data code can be equivalent to the password which must be input to the device for the device to operate. In this case, the security device then simply compares the two codes to see whether the correct code has been input by the driver. However, the code can also serve as an encryption key which has to combine correctly with the enabling code input by the driver to allow the engine to operate.

If desired, the value or values of the ignition timing advance may also be encrypted and only generated if the correct codes are received.

Figure 5:
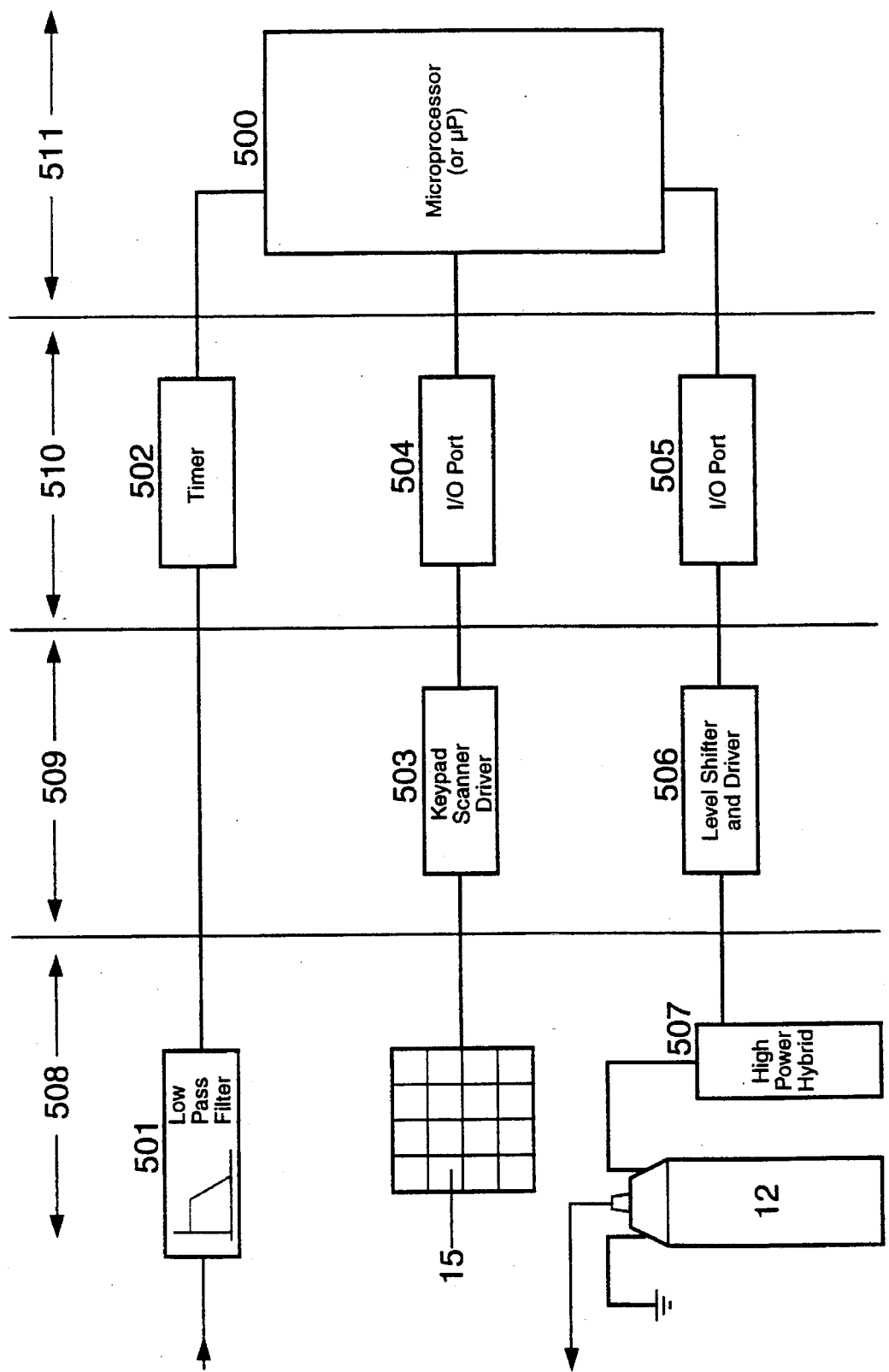
FIG. 5 shows a block diagram of the security device according to a second embodiment of the present invention.

A block diagram of the security system of the present invention according to a second embodiment is shown in FIG. 5. As with the first embodiment, the block diagram is split into physical interface 508, pre-processing hardware 509, microprocessor input/output 510 and processor 511.

This device has a much simpler arrangement than the first embodiment, and is primarily aimed at the lower cost end of the market.

As in the first embodiment, the security device 11 comprises a microprocessor 500 including read only memory for storing the program code and random access memory for use by the microprocessor during operation. The timing pulses from timing pulse generator 10 pass through low pass filter 501, which serves as a noise filter, pulse shaper and level shifter, etc., to timer 502 which provides timing information to the microprocessor. Keypad 15 is accessed by keypad scanner/driver 503, and data enters the microprocessor via I/O port 504. Ignition pulses generated by the microprocessor leave via I/O port 505, through level shifter and driver 506 and high power hybrid 507, before being supplied to the coil 12.

FIGS. 6A and 6B show a pulse timing diagram according to this second embodiment of the invention. FIG. 6A shows a graph of voltage against time for the sequence of timing pulses for one cycle of the engine produced by the timing pulse generator 10. The sequence comprises and index pulse 60 which marks the beginning of each revolution of the engine (normally when the first piston is at top dead centre)and timing pulses 61. FIG. 6B shows a graph of the ignition pulses 62 generated by the security device 11 from the timing pulse sequence.

In this embodiment, the code encoded in the timing pulse sequence is zero and therefore the timing pulse sequence consists of an index pulse and a number of equally-spaced timing pulses.

Once the correct enabling code is received by the security device, the device generates a sequence of ignition pulses 62 having the correct timing and duration for operation of the engine.

Top dead centre is detected by the device from the index pulse 60. The rotational speed of the engine is ascertained from the period of the raw data input, i.e. the timing pulse sequence as received from the timing pulse generator, without separation. The period of the timing pulses 61 gives the instantaneous angular speed of the engine, and the angular position of the engine can be calculated from the accumulation of these values.

If the number of timing pulses 61 in the sequence for one engine cycle corresponds to the number of ignition pulses required in that cycle, the device may simply advance or retard the timing pulses 61 to produce the correct ignition pulses 62. However, it is envisaged that any suitable number of timing pulses could be generated in each engine cycle, and this number may or may not equal the number of cylinders of the engine multiplied by an integer. The security device can then analyse the timing pulses and generate the ignition pulses based on the engine position and speed information contained in the sequence.

As with the first embodiment, the timing of the ignition pulses may be altered depending on the engine speed and load, etc., and as before, this may be achieved by conventional methods such as vacuum advance or look-up table.

Other embodiments and variations within the spirit and scope of the invention are anticipated.

What is claimed is:

1. An engine security system for an internal combustion engine comprising a security device arranged to receive a sequence of timing pulses generated in dependence on the rotation of said engine, to generate an ignition pulse sequence synchronous with the rotation of the engine from said sequence of timing pulses on receipt of an enabling code, and to supply said sequence to an ignition system of said engine for the generation of ignition sparks, such that pulses in said timing pulse sequence occur at different times from pulses in said ignition pulse sequence.

2. An engine security system for an internal combustion engine comprising a security device arranged to receive a sequence of timing pulses containing engine position and rotational speed information and generated in dependence on the rotation of said engine, said security device being further arranged to generate an ignition pulse sequence synchronous with the rotation of the engine from said information on receipt of an enabling code, and to supply said sequence to an ignition system of said engine for the generation of ignition sparks, said sequence of timing pulses having an identity code encoded therein.

3. The engine security system of claim 2 wherein said enabling code is a numerical code.

4. The engine security system of claim 2 wherein said identity code and said enabling code each have a value, said value of said identity code being related to said value of said enabling code.

5. The engine security system of claim 2 wherein said identity code is encoded in said sequence of timing pulses by means of frequency modulation.

6. The engine security system of claim 2 further comprising a magnetic pick-up pulse generator for generating said sequence of timing pulses.

7. The engine security system of claim 2 further comprising an optical pulse generator for generating said sequence of timing pulses.

8. The engine security system of claim 2 wherein pulses in said timing pulse sequence occur at different times from pulses in said ignition pulse sequence.

9. The engine security system of claim 2 wherein said ignition pulse sequence is supplied to an engine management system of said engine.

10. The engine security system of claim 2 wherein said identity code has a value, said value being zero.

11. The engine security system of claim 10 wherein said engine has a plurality of cylinders and the number of said timing pulses generated in one cycle of said engine and the number of said cylinders are in the ratio of M:N where M and N are different integers.

12. The engine security system of claim 10 wherein the number of said timing pulses generated in one revolution of said engine corresponds to the number of said ignition pulses in one revolution of said engine.

13. The engine security system of claim 12 wherein said engine has a coil for generating said ignition sparks and said device is mounted immediately adjacent said coil.

14. The engine security system of claim 12 wherein said device is mounted inside said coil.

15. The engine security system of claim 2 further comprising a remote handset which transmits said enabling code to said security device.

16. The engine security system of claim 15 wherein said remote handset transmits said identity code with each transmission.

17. The engine security system of claim 15 wherein the transmission from said handset is encrypted by means of an encryption key before transmission, said device decrypting and validating said transmission on receipt thereof.

18. The engine security system of claim 17 wherein said enabling code has a data value and said transmission is encrypted by adding said data value to a random number to generate said encryption key.

19. The engine security system of claim 17 wherein said device periodically transmits a new encryption key to said handset.

20. The engine security system of claim 19 wherein said device transmits a new encryption key to said handset after receiving each transmission.

* * * * *